United States Patent
Aramaki et al.

(10) Patent No.: US 6,442,167 B1
(45) Date of Patent: Aug. 27, 2002

(54) METHOD AND APPARATUS FOR COMMUNICATIONS OF FRAME RELAY DATA

(75) Inventors: Toru Aramaki, Yokohama; Tadashi Tamaoki, Yokosuka; Shigeo Arai; Toshimichi Noake, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/217,002

(22) Filed: Dec. 21, 1998

(30) Foreign Application Priority Data

Feb. 23, 1998 (JP) ............................................ 10-039998

(51) Int. Cl.$^7$ .............................................. H04L 12/28
(52) U.S. Cl. ............................ 370/395.43; 370/395.63; 370/230; 370/466
(58) Field of Search .................................. 370/230, 229, 370/231, 401, 465, 389, 474, 466, 467, 395.63, 395.65, 395.42, 395.43, 395.6, 395.61

(56) References Cited

U.S. PATENT DOCUMENTS

| | | | |
|---|---|---|---|
| 5,583,857 A | * 12/1996 | Soumiya et al. | 370/233 |
| 5,610,918 A | * 3/1997 | Kamo et al. | 370/395 |
| 6,034,964 A | * 3/2000 | Fukushima et al. | 370/401 |
| 6,144,669 A | * 11/2000 | Williams et al. | 370/401 |
| 6,205,152 B1 | * 3/2001 | Von Ahnen et al. | 370/419 |

OTHER PUBLICATIONS

English Translation of the Abstract of Japanese application No. 7-202903, Filed Jun. 8, 1995.
English Translation of the Abstract of Japanese application No. 6-276215, Filed Sep. 30, 1994.

* cited by examiner

Primary Examiner—Chau Nguyen
Assistant Examiner—Alexander O. Boakye
(74) Attorney, Agent, or Firm—Sofer & Haroun, LLP (57) ABSTRACT

The present invention intends to realize highly reliable communications between a frame relay network and an ATM network by corresponding service classes decided in both networks to each other. In order to achieve the above object, the frame relay data communication apparatus of the present invention used to allow communications between the frame relay network and the ATM network is provided with a frame receiver unit for receiving frame data from the frame relay network; a cell assembly unit for assembling received frame data into ATM cells and transmitting assembled cells to the ATM network; and a controller for controlling both frame receiver unit and cell assembly unit so as to extract priority order information from received frame data and receive priority order information of data used in ATM networks from an ATM network and decide a service class of the received data to assemble the received frame data into cells according to the decided service class.

11 Claims, 10 Drawing Sheets

METHOD AND APPARATUS FOR COMMUNICATIONS OF FRAME RELAY DATA

BACKGROUND OF THE INVENTION

1. Field of the Invention

The present invention relates to a technology of interfacing between communication networks whose data communication methods are different from each other, more particularly a method for communications of frame relay data to be transmitted and received via the Asynchronous Transfer Mode (ATM) and an apparatus for communications of frame relay data using the frame relay data communication method.

2. Description of the Related Art

A related art technology for transmitting and receiving frame relay data via an ATM switching system is disclosed, for example, Japanese Published Unexamined Application No. 7-202903. This related art technology is characterized as follows; when assembling variable length frame data into fixed length ATM cells, the frame data is converted to intermediate data once, then the intermediate data is divided into fixed-length data to be assembled into ATM cells. The related art technology also refers to a process for assigning service classes to those ATM cells when in assembling of frame data into ATM cells. This is to prevent the ATM switching network from occurrence of congestion. Concretely, the related art discloses two methods for such an assignment of service classes; in order to assign a service class, one of the methods changes the value of the cell loss priority identifier included in the header of each ATM cell corresponding to the communication form specified from an object frame relay terminal and the other of the methods references the discard eligibility indicator (DE) included in the object frame data and copies the value in the cell loss priority identifier.

There is also another invention with respect to a configuration of a frame relay interface circuit used to assemble frame data into ATM cells. The invention is disclosed in Japanese Published Unexamined Application No.6-276215.

The above related art technology includes a method for assigning service classes to ATM cells according to the communication form specified by an object frame relay terminal and the value of the discard eligibility indicator (DE) included in the object frame data. However, the process is nothing but a reference to the communication form or the discard eligibility indicator (DE) included in the object frame data. The processing is just continued fixedly until one communication transaction is ended.

Consequently, when some frame data including various types of data such as video, voice, and data communication data is assembled into ATM cells to be transmitted and received using the related art technology, it has been impossible to assign service classes to those ATM cells according to each data type.

Furthermore, if the order of priority for data types differs between the frame relay network and the ATM network, sometimes the difference causes a problem that some data with a high service class in the frame relay network is regarded to be ordinary data in the ATM network, so that it may be discarded when in a data congestion. For example, alarm information in a frame relay network is very important in the frame relay network, but it is regarded as general data in an ATM network.

The related art technologies described above have also been confronted with a problem that such data as a voice that cannot be delayed so much causes a communication error due to a cell assembly delay.

Furthermore, if the determination process of service class differs among systems so that, for example, priority is given to transmission and receiving of voice data in a system, but priority is given to transmission and receiving of video data in another system, it is also impossible for the related art technologies to change the determination process appropriately to the order of priority for ATM cells.

SUMMARY OF THE INVENTION

Under such the circumstances, it is an object of the present invention to provide a method for corresponding the service classes used for various types of data in a frame relay network to the service classes used for ATM cells storing the frame data in an ATM network in order to solve the above related art problems thereby to realize highly reliable communications. It is another object of the present invention to provide a frame relay data communication method for interlocking a frame relay network interface used for connecting a frame relay network to an ATM network with an ATM CLAD (ATM Cell Assembly and Disassembly) apparatus, as well as provide a frame relay data communication apparatus using the frame relay data communication method.

In order to solve the above related art problems, the frame relay data communication method of the present invention comprises steps of; receiving priority order information of data used ATM networks from an ATM network; extracting priority order information from frame data received from a frame relay network so as to decide a service class of the received frame data according to both the priority order information of the data in the ATM network and the priority order information of the received frame data, and then assembling the received frame data into ATM cells according to the decided service class.

The frame relay data communication apparatus of the present invention is provided with a frame receiver unit used to receive frame data from a frame relay network; a cell assembly unit used to assemble the received frame data into ATM cells and transmit the assembled ATM cells to the ATM network; a controller used to control each unit so as to extract the priority order information from the received frame data and receive the priority order information of data used in ATM networks from an ATM network thereby to decide a service class of the received frame data and assemble the received frame data into cells according to the decided service class.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Hereunder, preferred embodiments of the present invention will be described with reference to the accompanying drawings.

Figure 1:
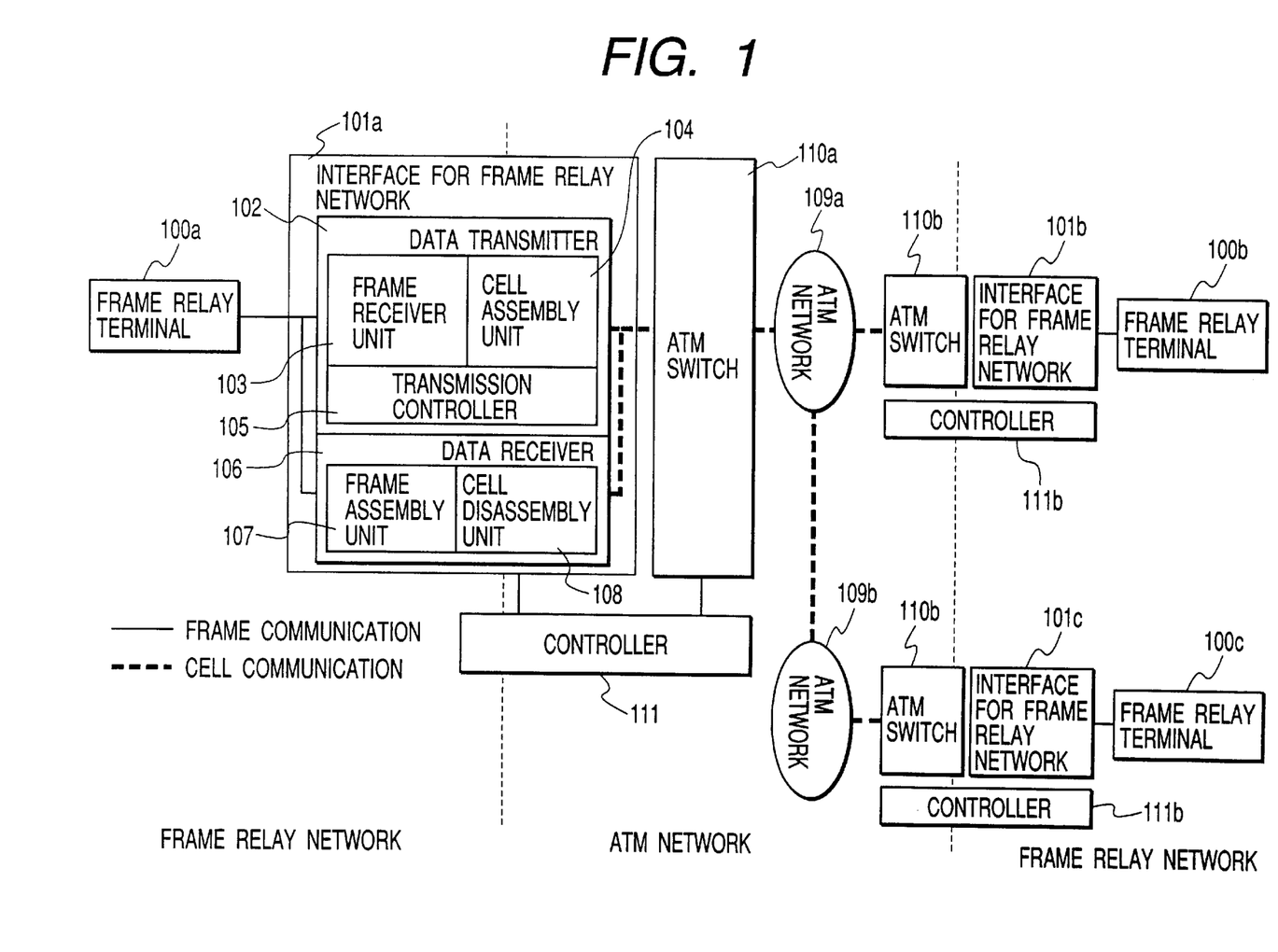
FIG. 1 is a block diagram of a whole system that uses the method and apparatus of the present invention for communications of frame data.

FIG. 1 is a block diagram of a whole system to which the present invention applies.

The system to which the present invention applies is composed so that a plurality of frame relay terminals 100a, 100b, and 100c are connected to a frame relay network via interfaces for frame relay network 101a, 101b, and 101c, as well as ATM switches 110a, 110b, and 110c. The system also goes through ATM networks 109a and 109b on its way to the frame relay network.

As described above, the present invention relates to interfaces for frame relay networks 110a, 110b, and 110c shown in FIG. 1, as well as the communication method. The interface for frame relay network 101 assembles frame data received from a frame relay terminal into ATM cells to be output. Output ATM cells are then transmitted to an ATM network after they are switched by the ATM switch 110. The controller 111 controls both the interface for frame relay network 101 and the ATM switch 110.

The interface for frame relay network 101 is composed of a data transmitter 102 and a data receiver unit 106. The data transmitter 102 is composed of a frame receiver unit 103 used to receive frame relay data from the frame relay terminal 100a, a cell assembly unit 104 used to assemble the frame data received by the frame receiver unit 103 into ATM cells and transmit the assembled ATM cells to an ATM network, and a transmission controller 105 used to control the frame receiver unit 103 and the cell assembly unit 104. The data receiver unit 106 is composed of a cell disassembly unit 108 used to receive ATM cells from an ATM network and disassemble the ATM cells and a frame assembly unit 107 used to assemble disassembled data into frames and transmit the frames to the frame relay terminal 100a.

Hereunder, the embodiments of the present invention will be described in detail respectively.

(1) Embodiment 1 (for assembling ATM cells by service class)

At first, the first embodiment of the present invention will be described with reference to FIG. 2 to FIG. 5 and Table 1.

Figure 2:
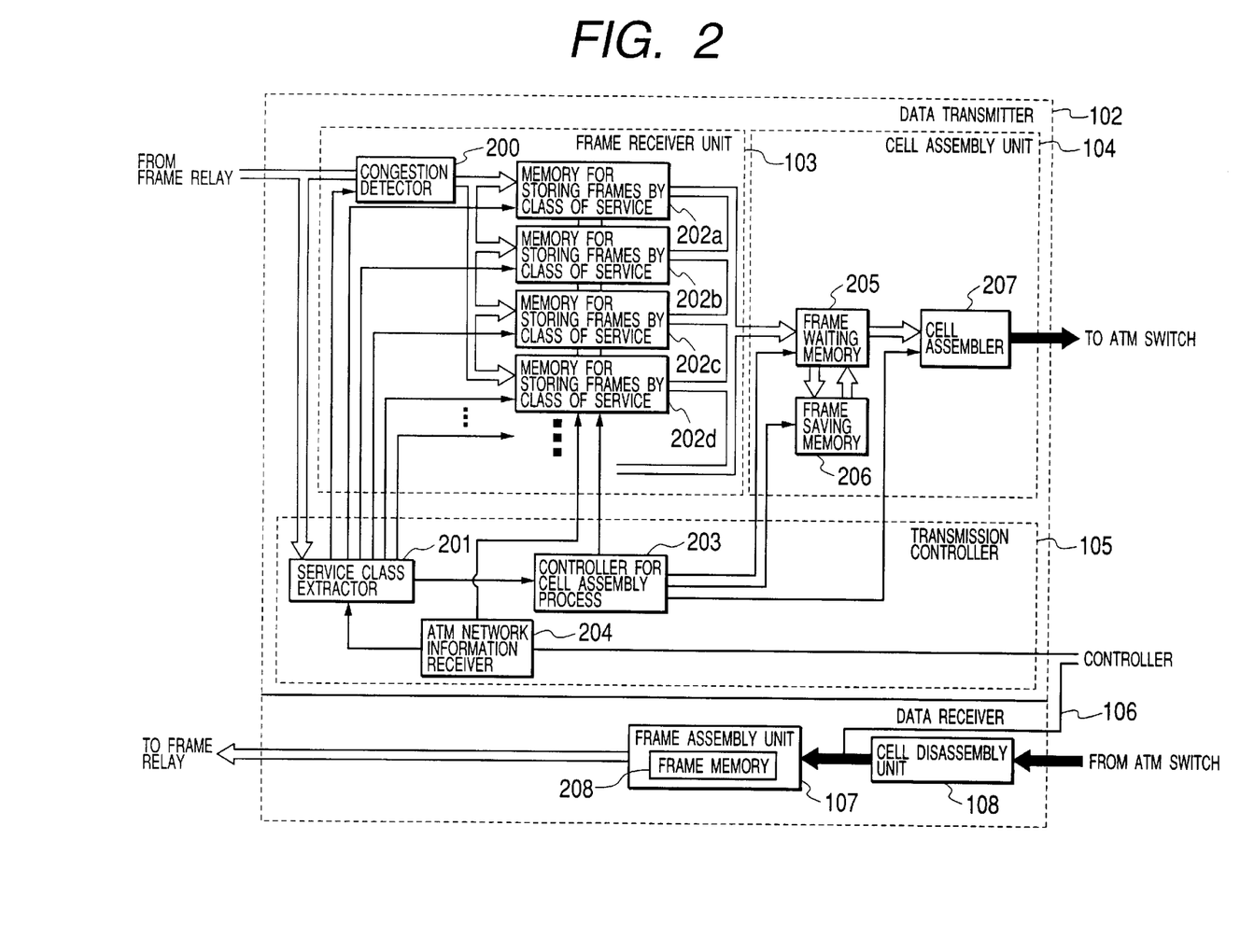
FIG. 2 is a block diagram of the frame data communication apparatus in the first embodiment of the present invention.

FIG. 2 shows a block diagram of the interface for frame relay network 101a.

Figure 3:
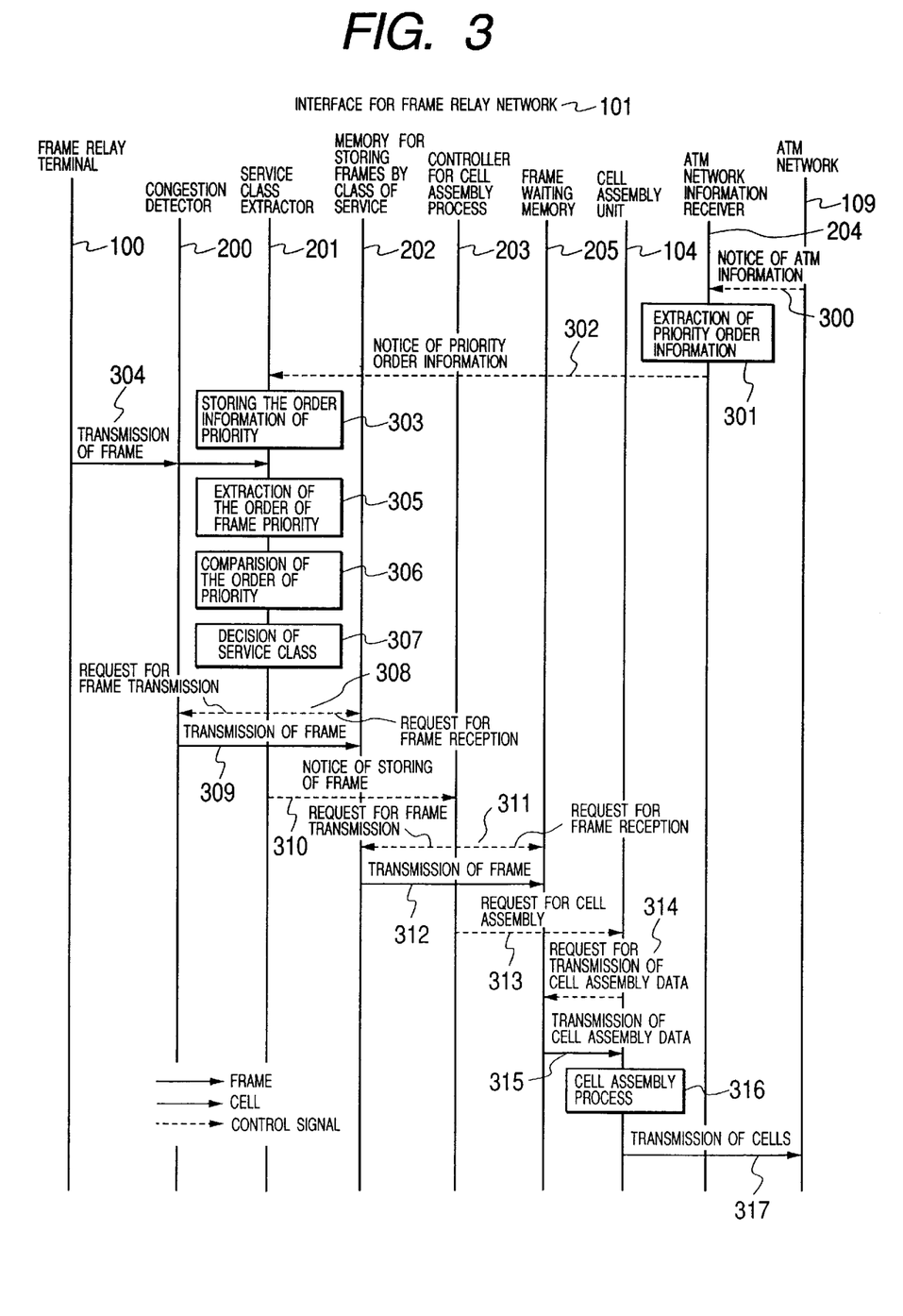
FIG. 3 illustrates a sequence of the basic operations of the frame relay data communication apparatus in the first embodiment of the present invention.

FIG. 3 shows a sequence of the basic operations of the interface for frame relay network 101a.

Figure 4:
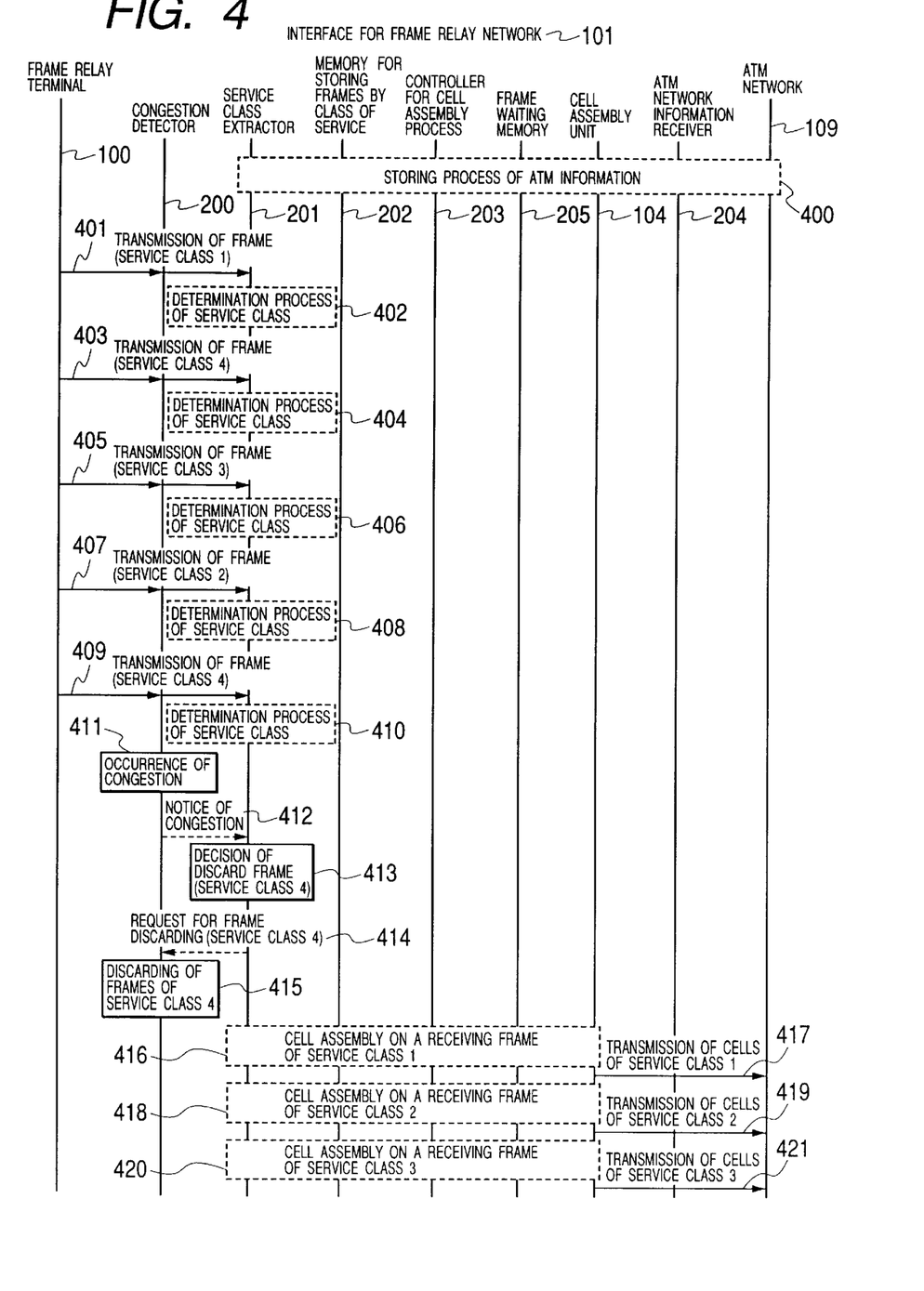
FIG. 4 illustrates a sequence of the operations of the frame relay data communication apparatus of the present invention to cope with a detected data congestion.

FIG. 4 shows a sequence of the operations of the interface for frame relay network 101a to cope with a detected congestion.

Figure 5:
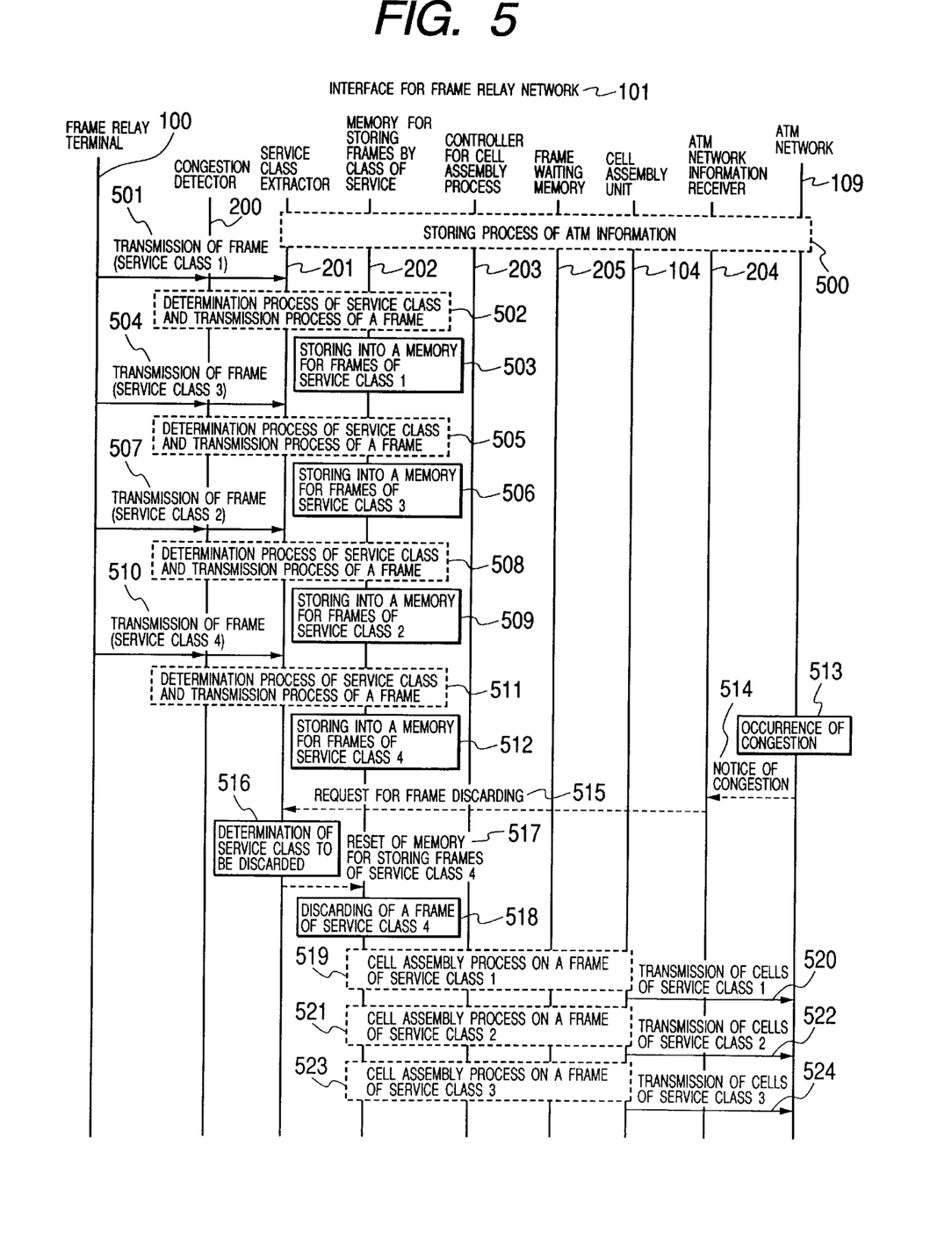
FIG. 5 illustrates a sequence of the operations of the frame relay data communication apparatus of the present invention to cope with a congestion detected in an ATM network.

FIG. 5 shows a sequence of the operations of the interface for frame relay network 101a to cope with a congestion detected in an ATM network.

Table 1 shows examples of priority order information in an ATM network, priority order information of frame data, and correspondence between priority order information of both ATM network and frame data.

At first, description will be made for the configuration of the interface for frame relay network, as well as the basic operations of the interface for assembling received frame data into ATM cells with reference to FIGS. 2 and 3.

The congestion detector 200 and the memories for storing frames by service class 202a, 202b, ... in FIG. 2 corresponds to the frame receiver unit 103 in FIG. 1. The frame waiting memory 205, the frame saving memory 206, and the cell assembler 207 in FIG. 2 correspond to the cell assembly unit in FIG. 1. In addition, the service class extractor 201, the controller for cell assembly process 203, and the ATM network information receiver 203 in FIG. 2 correspond to the transmission controller 105 in FIG. 1.

Receiving a frame from the frame relay terminal 100a, the frame relay data communication apparatus transmits the frame to both the service class extractor 201 and the congestion detector 200. The service class extractor 201 extracts the data link connection identifier (DLCI) registered in the address field of the received frame data. The DLCI is used to identify respective calls in frame relay communications. The service class extractor 201 extracts the data to be corresponded to the VPI/VCI in an ATM network and priority order information of the data included in the data field from the extracted DLCI. On the other hand, the priority order used in ATM networks is notified by the ATM network beforehand and stored in the interfaces for frame relay network 101a, 101b, and 101c. The ATM network information receiver receives the priority order information used in ATM networks. The service class extractor 201 stores the priority order information of the ATM network received from the ATM network information receiver 204, so that the information is used to decide a service class of each frame by comparing the information with the priority order information extracted from each entered frame data. The extractor 201 then stores the frame in the memory for storing frames by service class.

Service class information is also transmitted to the controller for cell assembly process 203 from the service class extractor 201. The controller for cell assembly process 203 begins transfer of frames to the frame waiting memory 205 with the frame of first service class. Transferred frames are assembled into ATM cells in the cell assembly unit 104 and the assembled cells are then transmitted to the ATM network 109a. If a higher service class frame is received during a cell assembly, the frame under processing is saved once in the frame saving memory 206 and transfers the higher service class frame to the frame waiting memory 205 so that the frame is assembled into cells earlier. When the cell assembly of the higher service frame is completed, the controller for cell assembly process 203 returns the frame saved in the frame saving memory 206 to the frame waiting memory 205 so that the frame is assembled into cells.

FIG. 3 shows a sequence of such the basic operations for assembling received frames into ATM cells as described above.

At first, receiving a notice of ATM network information from the ATM network 109 (step 300), the interface for frame relay network 101 instructs the ATM network information receiver 204 to analyze the contents and extracts the priority order information used in the ATM network (step 301), then the interface 101 notifies the service class extractor 201 of the priority order information of the ATM network (step 302). The service class extractor 201 then saves the received priority order information of the ATM network (step 303).

On the other hand, the frame data received from the frame relay network is transmitted to both the congestion detector 200 and the service class extractor 201 (step 304). (The leftmost frame relay terminal shown in FIG. 3 may be any terminal in the frame relay network; it is not a specific terminal, and so on.) The service class extractor 201 extracts the priority order information from the received frame data by referencing to the DLCI in the received frame (step 305). The service class extracts 201 then compares the priority order information of the frame data with the priority order information of the ATM network saved in the service class extractor 201 (step 306) thereby to decide the service class of the received frame (step 307).

Table 1 shows an example of a priority order used in ATM networks and an example of a priority order in each frame data.

TABLE 1

| Frame Relay Network | | Service Class | ATM Network | |
|---|---|---|---|---|
| Priority Order | Data Type | | Priority Order | Transmission Rate |
| 1 | Alarm information | 1 | 1 | CBR |
| 1 | Voice | 1 | 2 | VBR |
| 2 | Video | 2 | 3 | ABR |
| 3 | Data 1 | 3 | 4 | UBR |
| 4 | Data 2 | 4 | | |

In Table 1, the first priority is given to alarm information and voice data in frame relay networks and video data, data 1, and data 2 follow in order. In ATM networks, however, the first priority is given to CBR (Constant Bit Rate)data, then VBR (Variable Bit Rate)data and ABR (Available Bit Rate) data, and UBR (Unspecified Bit Rate) data follow in order. According to the priority order information of both networks, the service class extractor 201 decides the service class of each frame data. In this example shown in Table 1, the first priority frame in the frame relay network is corresponded to the CBR as service class 1. The second priority frame is corresponded to the VBR as service class 2. Hereafter, the third priority frame is corresponded to the ABR as service class 3 and the fourth priority frame is corresponded to the UBR as service class 4 respectively.

Back to FIG. 3. After the service class is decided (step 307), the service class extractor 201 issues a request for frame transmission to the congestion detector 200 and a request for frame receiving to the frame saving memory 1 202a corresponding to the service class 1 (step 308). Receiving the request, the congestion detector 200 transmits the frame received from the frame relay network to the frame saving memory 1 202a (step 309). Notified of the completion of the frame data saving in the frame saving memory 1 202a (step 310), the controller for cell assembly process 203 issues a request for frame transmission to the frame saving memory 1 202a and a request for frame receiving to the frame waiting memory 205 respectively (step 311), so that the frame saving memory 1 202a transmits the frame data to the frame waiting memory 205 (step 312). After this, if the controller for cell assembly process 203 issues a request for cell assembly to the cell assembly unit 104 (step 313), the cell assembly unit 104 issues a request for transmitting cell assembly data to the frame waiting memory 205 (step 314) and receives cell assembly data from the frame waiting memory 205 (step 315) to carry out a cell assembly process (step 316), then transmits the assembled cells to the ATM network (step 317).

Hereafter, a series of processes from notifying of ATM information (step 300) up to saving of priority order information (step 303) will be referred to as an ATM information saving process. A series of processes from priority order extraction from frames (step 305) up to determination of service classes (step 307) will be referred to as a service class determination process. A series of processes from requesting for frame transmission to the congestion detector and requesting for frame receiving to the frame saving memory from the service class extractor respectively (step 308) up to cell assembly process (step 316) will be referred to as a received frame cell assembly process. In addition, a series of processes from requesting for frame transmission to the congestion detector and requesting for frame receiving to the frame saving memory from the service class extractor respectively (step 308) up to the frame transmission from the congestion detector to the frame saving memory (step 309) will be referred to as a frame transmission process. Furthermore, a series of processes from transmission of a frame saving notice from the service class extractor to the controller for cell assembly process up to the cell assembly process will be referred to as a saved frame cell assembly process.

Next, description will be made for a process to cope with a congestion detected in the interface for frame relay network with reference to FIG. 4. If a congestion is detected in the interface for frame relay network 101, the congestion detector discards received frames of lower service classes. Thus, those frames are not transmitted to the memory for saving frames by service class.

At first, receiving frame data from a frame relay network (step 401) after a storing process of ATM information (step 400), the interface 101 performs a determination process of service class (step 402). After this, the interface continues the determination process of service class for the subsequent frame data to be received one after another (steps 403 to 410). Then, if the congestion detector 200 detects a congestion (step 411) and notifies the service class extractor 201 of the congestion occurrence (step 412), the service class extractor 201 decides the service classes of the frame data to be discarded therein (step 413). For example, it is decided here that the frame data of service class 4, the lowest service class, is discarded. Then, the service class extractor 201 issues a request for discarding the frame data of service class 4 to the congestion detector 200 (step 414), the congestion detector 200 thus discards the frame data of service class 4 (step 415). The cell assembly unit 104 then carries out a received frame cell assembly process for the rest frame data in order to their service classes and transmits assembled cells to the ATM network (steps 416 to 421).

Next, description will be made for a process to cope with a congestion detected in an ATM network with reference to FIG. 5. If a congestion is detected in an ATM network, frames of low service classes are discarded from the memory for storing frames by service class.

At first, the interface 101 performs a storing process of ATM information (step 500). Then, receiving frame data from a frame relay network (step 501), the interface 101 performs a determination process for service class (step 502). In this example, the first received frame is decided to be of the service class 1, so that the frame is transmitted to the frame saving memory of service class 1 to be saved therein (503). When another frame is saved (step 504), a service class is decided for the frame, for example, to be decided as of service class 3. The frame is thus transmitted to the frame saving memory of service class 3 (step 505) so as to be saved therein (step 506). Hereafter, the same process is carried out for the next received frame data of service class 2, as well as the subsequent frame data of service class 4. Thus, the service classes are decided for the frame data one after another, to be saved in the corresponding frame saving memory by service class (steps 507 to 512).

If a congestion is detected in an ATM network at this time (step 513), the congestion is notified from the ATM network to the ATM network information receiver 204 (step 514). Receiving the notice of the congestion detected in the ATM network, the ATM network information receiver 204 issues a request for frame discarding to the service class extractor 201 (step 515). The service class extractor 201 then decides the service classes to be discarded (step 516). In this case, it is decided that frames of service class 4 are to be discarded. The service class extractor 201 then instructs the frame saving memory of service class 4 to be reset (step 517). The frame saving memory of service class 4 then discards frames of service class 4 (step 518). Then, the frame saving memory assembles other saved frames in order of their service classes and transmits the assembled cells to the ATM network under the control of the controller for cell assembly process 203 (steps 519 to 524).

Although description was made for the correspondence between the priority order information of a frame relay network 20 and the priority order information of an ATM network in the above embodiment, it is also possible to display whether to give priority in the cell loss priority field of each ATM cell header corresponding to the service class of object frame data in the ATM cell assembly process.

As described above, since the priority order in the frame relay network is adopted for assembling ATM cells in the first embodiment, it is avoided that frame data of a high service class in the frame relay network is discarded and the cell assembly process is delayed. Consequently, important data such as frame relay network alarm data can be assembled into cells and transmitted without fail. In addition, since priority is given to assemble such data as voices that cannot be delayed so much to cells so as to be prevented from delay, it is possible to cope with data communications that must be done at accurate timings.

(2) Second Embodiment (for coping with congestions recurring in a frame relay network)

Next, the second embodiment of the present invention will be described with reference to FIGS. 6 and 7.

Figure 6:
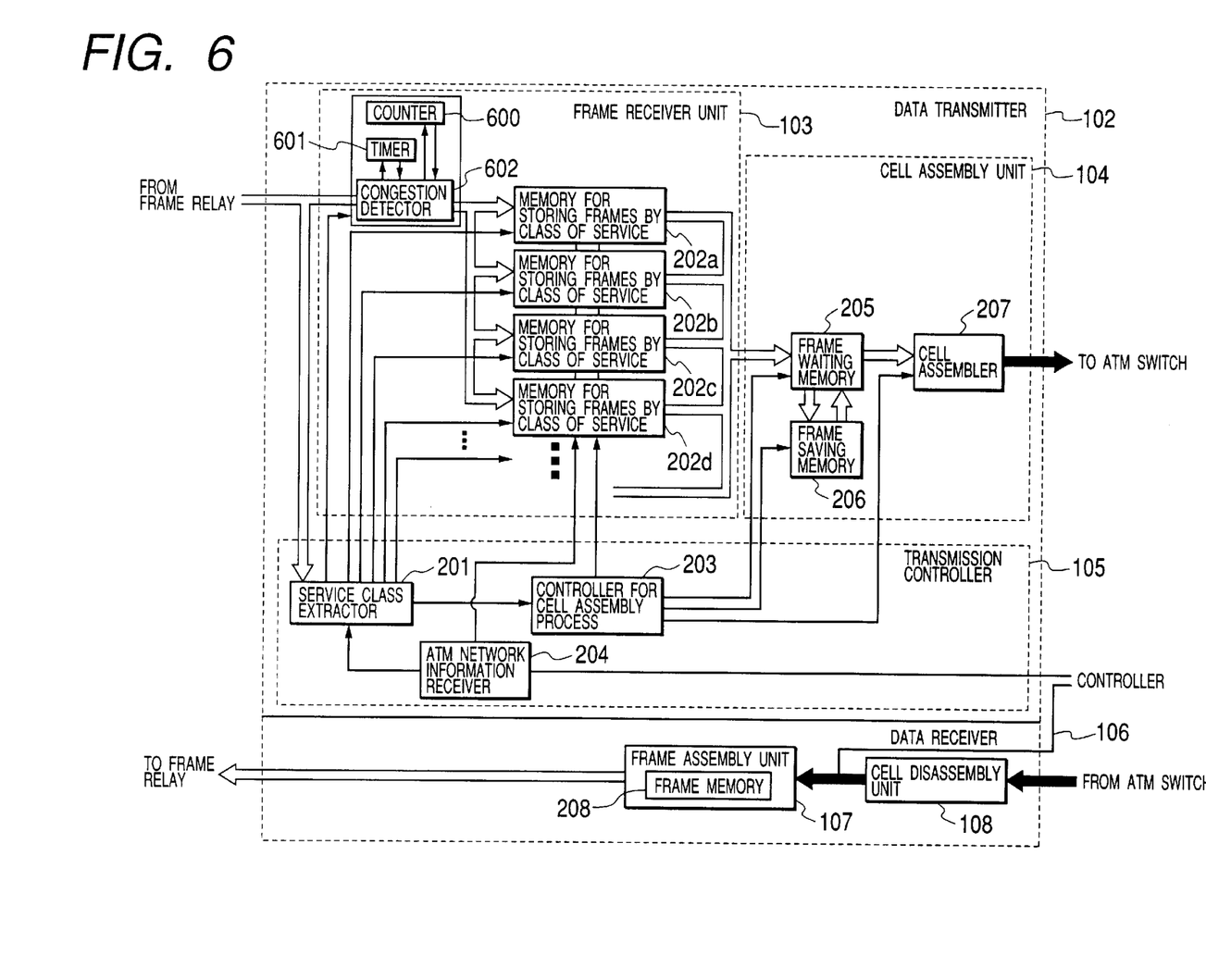
FIG. 6 is a block diagram of the frame relay data communication apparatus in the second embodiment of the present invention.

FIG. 6 shows a block diagram of the interface for frame relay network in the second embodiment of the present invention.

Figure 7:
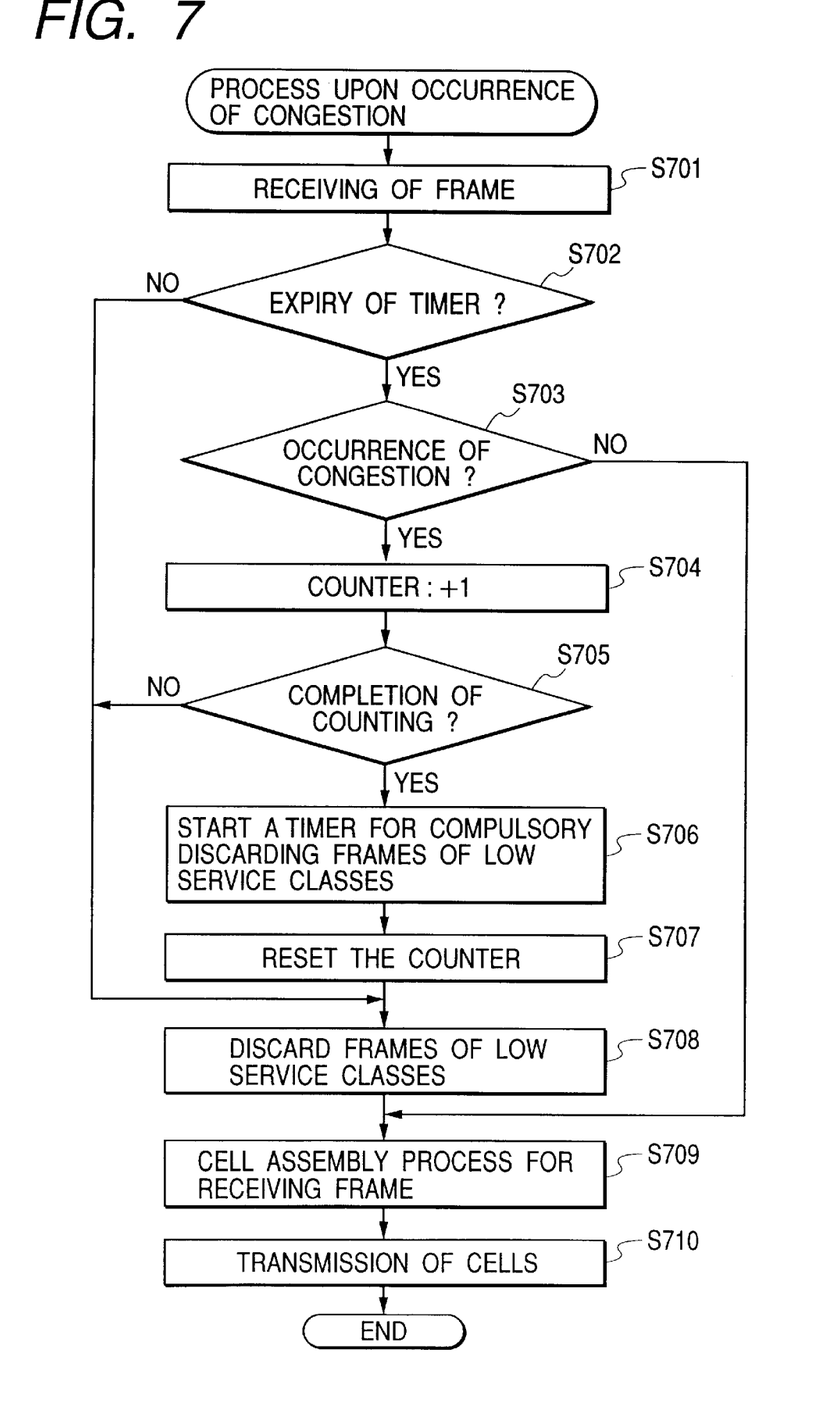
FIG. 7 illustrates a sequence of the basic operations of the frame relay data communication apparatus in the second embodiment of the present invention.

FIG. 7 shows a flow chart of a process carried out by an interface for frame relay network in the second embodiment.

In the second embodiment, the congestion detector 602 of the interface for frame relay network is provided with a timer 601 and a counter 600. The counter counts the number of detected congestions and the timer is started to discard frames of low service classes for a fixed time if many congestions are detected repetitively.

Hereunder, a process flow to be carried out to cope with such congestions detected repetitively with reference to FIG. 7. At first, if the congestion detector 602 receives frame data from a frame relay network (step 701), the congestion detector 602 checks if the timer 601 stops (step 702). If the timer 601 is active, the congestion detector 602 discards received frame data of low service classes (step 708), since congestions are detected repetitively now. After this, the congestion detector assembles only the frames of high service classes to cells (step 709) and transmits the assembled cells to the ATM network (step 710).

On the other hand, if the timer stops (step 702), the congestion detector 602 assembles received frames to cells (step 709) as long as no congestion is detected (step 703). The congestion detector 602 then transmits the assembled cells (step 710). If a congestion is detected (step 703), the counter counts up its value (step 704). If the counter value reaches a predetermined value as a result of the counting-up (step 705), the timer is started for a fixed time (step 706) and the counter 600 is reset (step 707). After this, frames of low service classes are discarded (step 708) until the timer 601 stops. Only the frames of high service classes are thus assembled into cells (step 709) and the assembled cells are transmitted to the ATM network (step 710). Even when the value of the counter 600 does not reach the predetermined value yet, frames of low service classes are discarded (step 708) and only the frames of high service classes are assembled into cells (step 709) and the cells are transmitted to the ATM network (step 710).

In the second embodiment, if congestions occur repetitively, frames of low service classes are discarded automatically for a fixed time. It is thus possible to prevent occurrence of congestions in the interface for frame relay network. In addition, such congestion occurrence can be controlled by using the characteristics of the congestion that occurs temporarily.

(3) Third Embodiment (for a cell assembly process at a decided transmission rate for frames of low service classes)

Hereunder, the third embodiment of the present invention will be described with reference to FIGS. 8 and 9.

Figure 8:
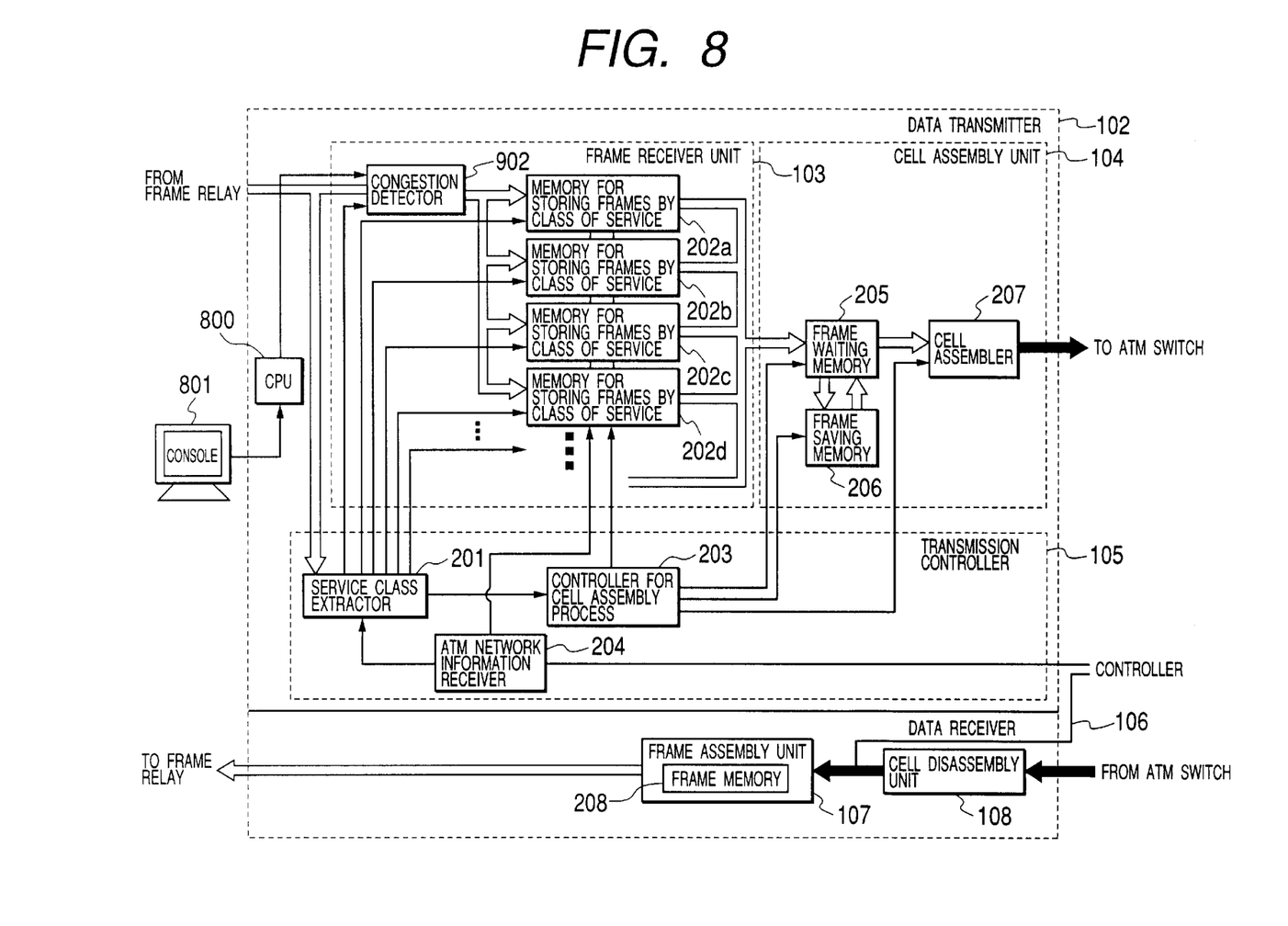
FIG. 8 is a block diagram of the frame relay data communication apparatus in the third embodiment of the present invention.

FIG. 8 shows a block diagram of the interface for frame relay network in the third embodiment of the present invention.

Figure 9:
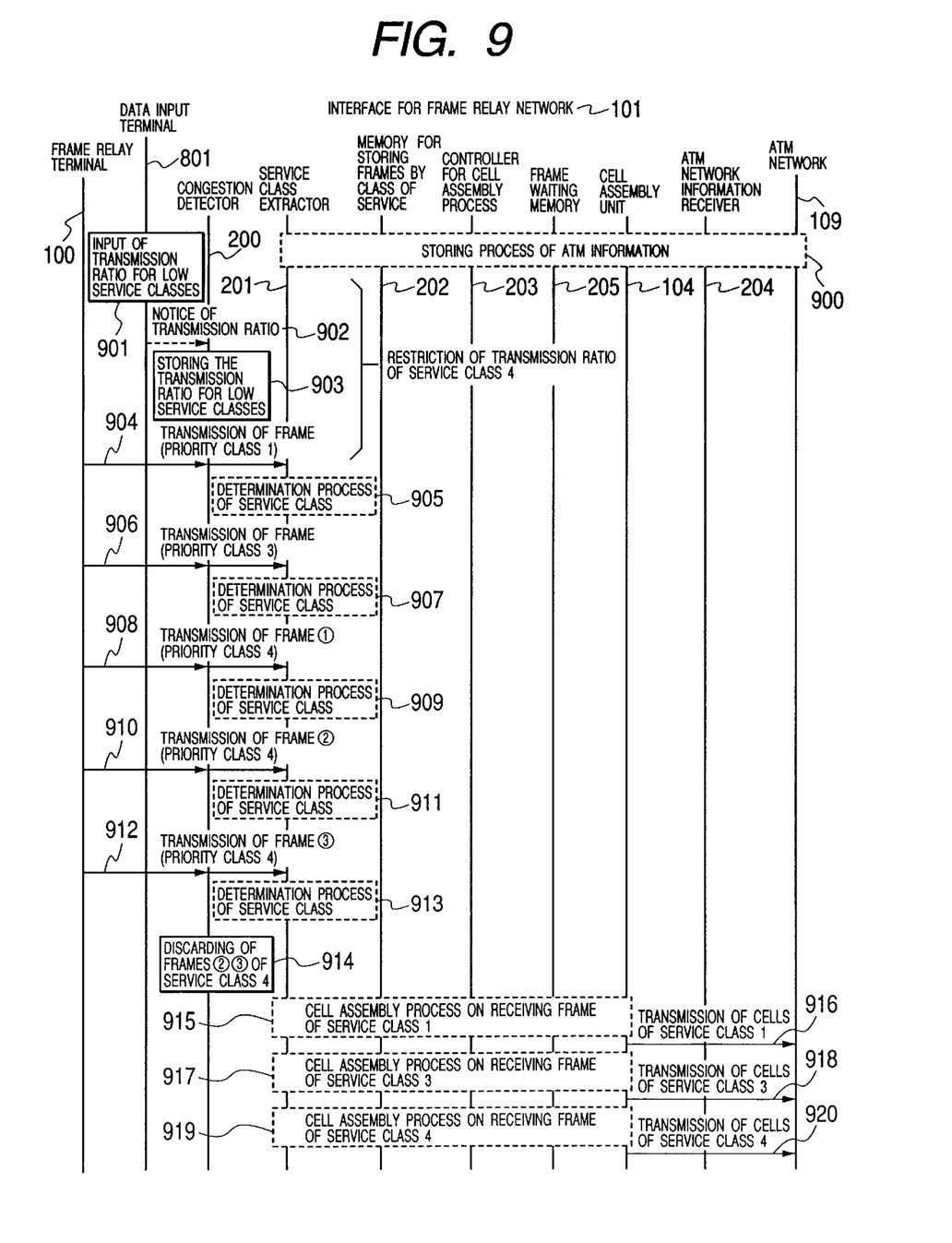
FIG. 9 illustrates a sequence of the basic operations of the frame relay data communication apparatus in the third embodiment of the present invention.

FIG. 9 shows a sequence of the operations performed by the interface for frame relay network in the third embodiment.

In the third embodiment, the interface for frame relay network is provided with a CPU 800 and a console 801 as shown in FIG. 8, so that a transmission rate of frame data of low service classes is predetermined and the value is entered to the console. According to the entered rate, frame data is discarded or assembled into cells.

Next, operations of the interface for frame relay network in the third embodiment will be described with reference to FIG. 9.

In the same way as the first and second embodiments, at first, a storing process of ATM information is performed (step 900). The CPU 800 analyzes the transmission rate of frame data of low service classes entered to the console 801 (step 901) and transmits the result (rate) to the service class extractor 201 (step 902). The service class extractor 201 then saves the rate value received from the CPU 800 (step 903). Such a transmission rate is set, for example, so that frames of service class 4 should be one or under per unit time.

After a transmission rate of frame data of low service classes is set, frame data received from a frame relay network is transmitted to the service class extractor 201 (step 904) to decide service classes for them (step 905). FIG. 9 shows a case in which three frames (a frame of service class 1, a frame of service class 3, and a frame of service class 4) are received within a unit time (steps 906 to 913). The congestion detector 902 discards two frames of service class 4 according to the transmission rate of the frames of service class 4 stored before (step 914). The congestion detector 902 then performs a cell assembly process for the rest received frames of service classes 1 and 2, as well as one frame of service class 4 in order of their service classes, then transmits assembled cells to the ATM network (steps 915 to 920).

Although description was made for a case only a transmission rate of frames of service class 4 above, the transmission rate may be decided for every service class or only for some of service classes.

In the third embodiment described above, a transmission rate is predetermined for each service class, so that it is prevented that frames of high service classes are discarded even when many frames of low service classes are received. And accordingly, frames of high service classes can be assembled into cells without fail. In addition, since frames of a low service class, when exceeding a predetermined transmission rate, are discarded, so that the interface for frame relay network can be prevented from congestions.

(4) Fourth Embodiment (for a dynamic change of priority order)

Next, the fourth embodiment of the present invention will be described with reference to FIG. 10.

Figure 10:
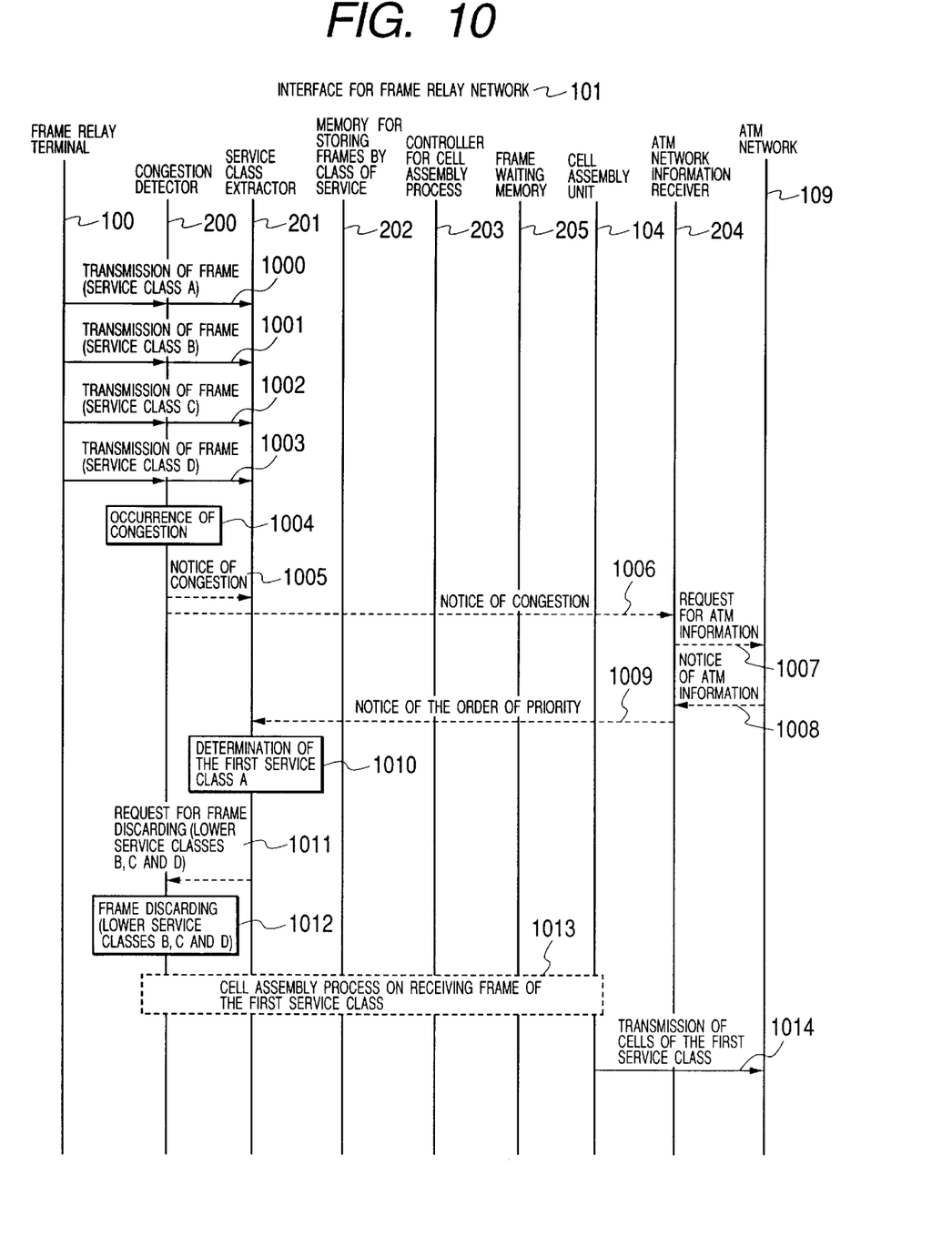
FIG. 10 illustrates a sequence of the basic operations of the frame relay data communication apparatus in the fourth embodiment of the present invention.

FIG. 10 shows a sequence of the operations performed by the interface for frame relay network in the fourth embodiment of the present invention.

At first, the interface receives frame data from the frame relay terminal 100 (steps 1000 to 1003). The received frame relay data is assumed to be of priority order information A, B, C, and D in the frame relay network. It is premised here that the congestion detector 200 detects a congestion state in the frame relay network after those frame data are received (step 1004). The congestion detector 200 then notifies the service class extractor 201 and the ATM network information receiver 204 of the detected congestion (steps 1005 and 1006). Receiving the notice, the ATM network information receiver 204 issues a request for ATM information to the ATM network (step 1007) and receives an notice of ATM network information from the ATM network (step 1008). The ATM network information receiver 204 analyzes the contents to extract the priority order information in the ATM network, then notifies the service class extractor of the result (step 1009).

The service class extractor 201 then saves the received priority order information of the ATM network and corresponds the priority order information extracted from the received frame data to the priority order information of the ATM network thereby to decide the service class for each of the received frame data including the first service class (step 1010). In the fourth embodiment, it is premised that the first service class is given to the frame data of priority order information A in the frame relay network. For example, only the frame data of first service class is assembled into cells and frame data of other service classes is discarded. The service class extractor 201 notifies the congestion detector 200 that the frame data of priority order information B, C, and D (step 1011) will be discarded (step 1011). The congestion detector 200 then discards the frame data of priority order information B, C, and D (step 1012). On the other hand, the interface performs a cell assembly process for received frame data in the highest priority information A (step 1013), which corresponds to first service class and transmits the assembled cells (step 1014).

In the fourth embodiment, each time a congestion is detected, the interface requests and receives ATM network information to and from the object ATM network to correspond the priority order between the frame relay network and the ATM network. Consequently, it is possible in this embodiment to change the determination of service classes according to a change of the priority order in the ATM network. In this embodiment, priority is given to the frames of first class in the cell assembly process and frame data of other service classes is discarded. However, this embodiment may be modulated, for example, so as to discard only the frame data of the lowest service class.

The fourth embodiment, therefore, can cope with changes of the priority order flexibly even during communication.

According to the present invention, therefore, since the priority order in the frame relay network can be adopted even for ATM communications as described above, it is possible to realize highly reliable communications in which information in a high priority order is prevented from being discarded and/or delayed.

What is claimed is:

1. A frame relay data communication apparatus for connecting a frame relay network to an ATM network, comprising:
   a congestion detector for receiving frame data transmitted from a frame relay network and detecting congestion from said received frame data;
   an ATM network information receiver for receiving information from said ATM network;
   a service class extractor for controlling so as to save priority order information of data used in ATM network, received by said ATM network information receiver and extract the priority order information of said received frame data thereby to decide a service class of said received frame data according to said priority order information of said ATM network and said priority order information of said frame data so that said received frame data is transferred from said congestion detector to a memory for saving frames by service class according to said decided service class;
   a controller for cell assembly process for controlling so as to read frame data from said memory for storing frames by service class in order of service classes and transmitting read frame data to a cell assembly unit; and
   a cell assembly unit for assembling frame data into cells and transmitting assembled cells to said ATM network, wherein
      said congestion detector, when detecting a congestion of frame data, notifies said service class extractor of said detected congestion so that frames of low service classes are discarded under the control thereof.

2. A frame relay data communication apparatus for connecting a frame relay network to an ATM network, comprising:
   a frame receiver unit for receiving frame data transmitted from a frame relay network;
   a cell assembly unit for assembling said received frame data into ATM cells and transmitting assembled cells to said ATM network; and
   a controller for controlling said frame receiver unit and said cell assembly unit so as to extract priority order information from received frame data and receive priority order information of data used in ATM networks from an ATM network and decide a service class of the received data to assemble the received frame data into cells according to the decided service class, wherein said frame receiver unit includes a congestion detector for detecting frame data congestion, said congestion detector notifies said controller of each detected congestion, and said controller controls said frame receiver unit when notified of a congestion so as to discard frames of low service classes.

3. The frame relay data communication apparatus according to claim 2, wherein
said congestion detector includes a counter for counting the number of detected congestions and a timer to be started when the value of said counter reaches a predetermined value so as to discard frame data of low services classes, received for a fixed time.

4. The frame relay data communication apparatus according to claim 2, wherein
said congestion detector notifies said ATM network information receiver of each detected congestion and said ATM network information receiver, when receiving said congestion notice, requests an object ATM network for priority order information of data used in said ATM network and notifies said service class extractor of said received priority order information,
said service class extractor decides service classes of frame data to be discarded according to said priority order information of ATM network obtained after said congestion is detected, and said congestion detector discards frame data under the control of said service class extractor.

5. A frame relay data communication apparatus for connecting a frame relay network to an ATM network, comprising:
a frame receiver unit for receiving frame data transmitted from a frame relay network;
a cell assembly unit for assembling said received frame data into ATM cells and transmitting assembled cells to said ATM network; and;
a controller for controlling said frame receiver unit and said cell assembly unit so as to extract priority order information from received frame data and receive priority order information of data used in ATM networks from an ATM network and decide a service class of the received data to assemble the received frame data into cells according to the decided service class, wherein said controller, when receiving notice of congestion from an ATM network, controls the frame receiver unit so as to discard frames of low service classes.

6. A frame relay data communication apparatus for connecting a frame relay network to an ATM network, comprising:
a data receiver unit for receiving frame data from a frame relay network;
an ATM network information receiver for receiving priority order information used in ATM networks from an ATM network;
a service class extractor for controlling so as to store priority order information and extract priority order information from received frame data, as well as decide a service class of said received frame data by comparing priority order information of said ATM network and transfer said received data from said frame receiver unit to a memory for storing frames by service class according to said decided service class;
a controller for cell assembly process for controlling so as to read frame data from said memory for storing frames by service class in order of service classes and transmit read frame data to said ATM network; and a cell assembly unit for assembling frame data into ATM cells and transferring assembled cells to said ATM network, wherein
said ATM network information receiver, when receiving a notice of congestion notifies said service class extractor of occurrence of said congestion, and
said service class extractor controls said memory for storing frames by service class so as to discard frames of low service classes.

7. A frame relay data communication apparatus for connecting a frame relay network to an ATM network, comprising:
a congestion detector for detecting congestions of frame data received from said frame relay network;
an ATM network information receiver for receiving information from said ATM network;
a service class extractor for controlling said memory for storing frames by service class so as to save priority order information of data used in ATM networks, received by said ATM network information receiver and extract the priority order information of said received frame data thereby to decide a service class of said received frame data according to said priority order information of said ATM network and the priority order information of said frame data so that said received frame data is transferred from said congestion detector to a memory for saving frames by service class according to said decided service class;
a controller for cell assembly process for controlling so as to read frame data from said memory for storing frames by service class in order of their service classes according to said service class and transmit read frame data to a cell assembly unit;
a cell assembly unit for assembling frame data into ATM cells and transmitting assembled cells to said ATM network; and
an analyzer for analyzing a control terminal and information entered from said control terminal, wherein
said analyzer, when receiving a transmission rate of frames of each service class from said control terminal, analyzes said transmission rate of frames and notifies said congestion detector of the result, and
said congestion detector discards received frame data according to said transmission rate of frames.

8. A frame relay data communication method for assembling frame data received from a frame relay network into ATM cells and disassembling cells received from said ATM network to frame data, comprising steps of
receiving priority order information of data used in ATM networks from an ATM network;
extracting priority order information of received frame data upon receiving frame data from a frame relay network so as to decide a service class of received frame data according to priority order information of said ATM network and priority order information of said received frame data;
discarding frame data of low service classes when a congestion of frame data is detected;
storing rest frame data by service class; and
reading frame data in order of service classes and assembling said frame data into cells and transmit assembled cells to said ATM network.

9. A frame relay data communication method according to claim 8, wherein received frame data of low service classes is discarded upon receiving a notice of congestion from an ATM network.

10. A frame relay data communication method for assembling frame data received from a frame relay network into ATM cells and disassembling cells received from an ATM network to frame data, comprising steps of:

receiving priority order information of data used in ATM networks from an ATM network;

extracting priority order information from received frame data upon receiving said frame data from a frame relay network so as to decide a service class of said received frame data according to priority order information of said ATM network and priority order information of said received frame data, and storing said received frame data by service class according to said decided service class, discarding said stored frame data of low service classes upon receiving a congestion notice from said ATM network, and reading rest frame data from said memory in order of service classes so as to assemble said rest frame data into cells and transmit assembled cells to said ATM network.

11. A frame relay data communication method for assembling frame data received from a frame relay network into ATM cells and disassembling cells received from an ATM network to frame data, comprising steps of:

receiving priority order information of data used in ATM networks from an ATM network;

extracting priority order information from said frame data upon receiving said frame data from a frame relay network so as to decide a service class of said received frame data according to priority order information of said ATM network and priority order information of said received frame data;

discarding frame data received over a frame transmission rate for each service class, according to a frame transmission rate by service class entered from external;

storing rest frame data of high service classes in corresponding memories by service class, and reading said stored frame data of said high service classes in order of service classes so as to assemble said frame data into cells and transmit assembled cells to said ATM network.

* * * * *